May 21, 1957     R. M. SCOTT ET AL     2,792,742
APPARATUS FOR THE MEASUREMENT OF ANGLE
Filed Feb. 16, 1954     3 Sheets-Sheet 1
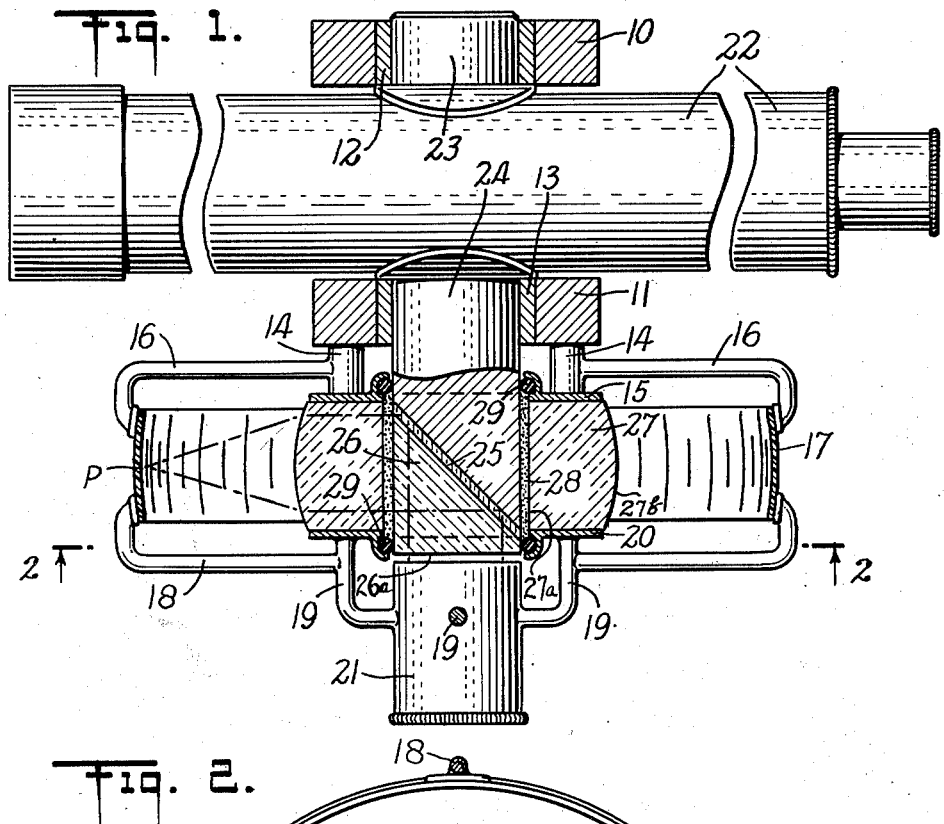
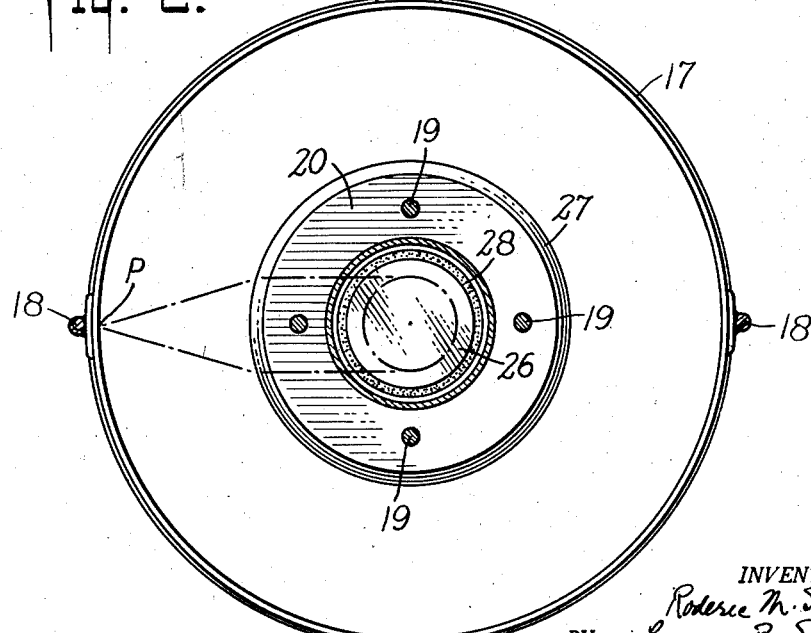
INVENTORS
Roderic M. Scott
Larkin B. Scott
BY
Pennie Edmonds Morton Barrows Taylor
ATTORNEYS May 21, 1957 R. M. SCOTT ET AL 2,792,742
APPARATUS FOR THE MEASUREMENT OF ANGLE
Filed Feb. 16, 1954 3 Sheets-Sheet 2

INVENTORS
Roderic M. Scott
BY Larkin B. Scott
Pennie Edmonds Morton Barrows Taylor
ATTORNEYS May 21, 1957 R. M. SCOTT ET AL 2,792,742
APPARATUS FOR THE MEASUREMENT OF ANGLE
Filed Feb. 16, 1954 3 Sheets-Sheet 3

INVENTORS
Roderic M. Scott
Larkin B. Scott
BY
Pennie, Edmonds, Morton, Barrows, & Taylor
ATTORNEYS United States Patent Office 2,792,742
Patented May 21, 1957

2,792,742

APPARATUS FOR THE MEASUREMENT OF ANGLE

Roderic M. Scott, Stamford, and Larkin B. Scott, New Canaan, Conn., assignors to The Perkin-Elmer Corporation, Norwalk, Conn., a corporation of New York Application February 16, 1954, Serial No. 410,510

12 Claims. (Cl. 88—2.3)

This invention relates to the measurement of angle and is concerned more particularly with a novel optical system, by means of which the angular spacing between a pair of objects or the extent of angular movement of a rotary member from a fixed point can be measured with extreme accuracy. In the new system, the measurement of the spacing of the objects or of the movement of the member is made by reference to a scale, which is presented at infinity and in such manner that it may be read in direct relation to the objects or member, which are ordinarily also at infinity. The new system is consequently devoid of parallax and errors in reading the scale do not arise even when the point, from which the scale is read, is not precisely located with reference to the scale.

The system of the invention comprises, essentially, a scale inscribed upon a surface of substantially spherical curvature, optical means for collimating the image of the scale, and optical means for observing the scale in a direction bearing a known relation to the direction of the object or member from the observer. The portion of the scale in use at any time is ordinarily borne by an equatorial zone of the sphere and the collimating means forms a virtual image of the scale at infinity, when the scale is viewed from a point at or near the center of curvature of the scale, and includes a spherical optical surface concentric with the scale. The final element of the system may take the form of a pair of telescopes having their axes at a fixed angle to each other or a single telescope together with a sight of the reflex type, which superimposes the scale upon the scene being viewed through the telescope.

For a better understanding of the invention, reference may be made to the accompanying drawings, in which Fig. 1 is a top plan view, with parts broken away and shown in section, of one form of device embodying the new system;

Fig. 2 is a sectional view on the line 2—2 of Fig. 1;

Figure 3:
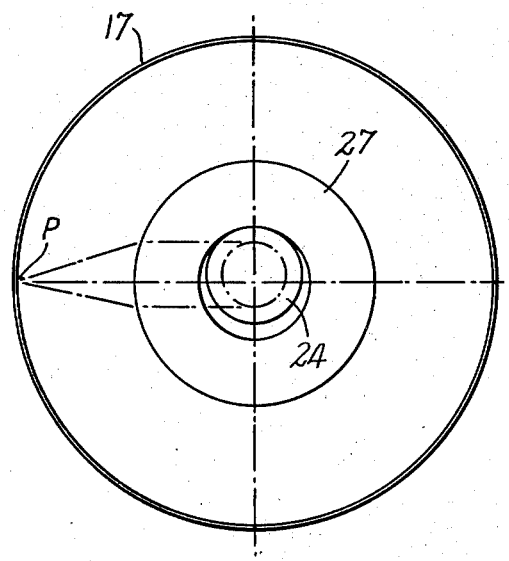
Figs. 3 and 4 are diagrammatic views similar to Fig. 2 and showing the effect of displacement of the rotary member in its bearings.

The form of the new device illustrated in Figs. 1 and 2 is similar to a transit and includes a pair of arms 10, 11 rigidly mounted on a suitable support or base and containing respective bearings 12, 13, which are illustrated as of the sleeve type, although bearings of the anti-friction type may be employed, if preferred. A plurality of studs 14 attached to arm 11 extend generally parallel to the common axis of the bearings and, at their outer ends, the studs carry a plate 15 lying normal to the axis. The studs also carry arms 16 extending radially and supporting a strip 17 having a shape approximating that of the equatorial zone of a sphere concentric with the bearing axis with a scale inscribed on its inner surface. A second group of arms 18 attached to the scale strip extend inwardly and support arms 19, which carry at one end a plate 20 lying parallel to plate 15 and, at the other, a telescope 21. The scale on strip 17 lies opposite the space between the plates 15, 20.

In the device shown in Figs. 1 and 2, the member, of which the angular movement is to be measured, takes the form of a telescope 22 having a barrel with coaxial trunnions 23, 24 extending from opposite sides of the barrel at right angles to the axis thereof and serving as journals supported in bearings 12, 13, respectively. The trunnion 24 projects through its bearing 13 and its end is cut off at an angle of 45° to the common axes of the trunnions and lies normal to a plane through the axes of the trunnions and the telescope 22. The diagonal end surface of trunnion 24 is silvered to form a mirror 25, and a piece of glass 26, which is of the same circular cross-section as trunnion 24 and is cut off at one end at an angle of 45°, is mounted to lie with its angular surface opposed to mirror 25. The outer surface 26a of the glass element is flat and lies normal to the trunnion axis and faces the adjacent end of telescope 21.

The collimating device is an annular optical component 27 mounted between plates 15 and 20 and encircling the diagonal surfaces on trunnion 24 and the piece of glass 26. The component has a cylindrical inner surface 27a lying coaxial with the bearings, and a spherical outer surface 27b having a center coinciding with the center of curvature of scale 17 and a radius half that of scale 17. Thus, scale 17 lies at the focal point of component 27 and accordingly, light from a point P on the scale is collimated on entering component 27, as illustrated by the broken lines. The element 26 and the component 27 are made of glass of the same index of refraction and the space between the inner surface of the component and the surfaces of the trunnion 24 and of the glass element 26 may be filled with a film of optical sealing liquid 28 held in place in any suitable manner, as, for example, by rubber O-rings 29 seated in circumferential channels on plates 15 and 24 and bearing against the surfaces of trunnion 24 and the glass element 26, respectively. If the parts fit tightly, the sealing liquid may be eliminated, since the thin cylindrical air lens left by omission of the liquid does not introduce aberration to a troublesome amount. When a sealing liquid is used, its index of refraction is preferably the same as that of the glass elements. With the construction described, light from scale 17 passing through component 27 and element 26 is not distorted but remains collimated on leaving surface 26a and entering telescope 21. Hence the scale is presented at infinity when viewed through telescope 21.

The telescopes 21 and 22 contain cross hairs in a fixed relation to one another, so that, when the cross hairs of telescope 22 are fixed upon an object and the scale is then examined through telescope 21, the location of the object on the scale may be determined. Since the scale and the object are, in effect, at infinity, the accuracy, with which telescope 22 is mounted and centered relative to the fixed telescope 21 and the remainder of the optical system, is unimportant. The telescope 21 permits an observer to view the scale from a point at or near the center of curvature of the scale and this avoids the effect of errors in the mounting and centering of telescope 22, as will be apparent from the following.

If a reading on the scale is made by means of telescope 21 at a time when the trunnions 23, 24, the bearings 12, 13, and the scale member 17 are exactly coaxial, light from a point P on the scale is collimated by the optical component 27 and the collimated light falls upon mirror 25 and is changed in direction. The collimated light then enters the telescope 21, where it is brought to a focus and an image of the point, which can be examined through the eye-piece of the telescope, is formed. However, if at the time of taking a reading, the trunnions, bearings, and scale are not coaxial and the trunnions are displaced, as indicated by trunnion 24 in Fig. 3, the image formed in the telescope will still be that of point P. The reason is that, under the conditions stated, part of the collimated beam produced from light from the point P will fall upon mirror 25 and enter the telescope, and such light will be brought to a focus and an image of the point P will be formed.

Figure 4:
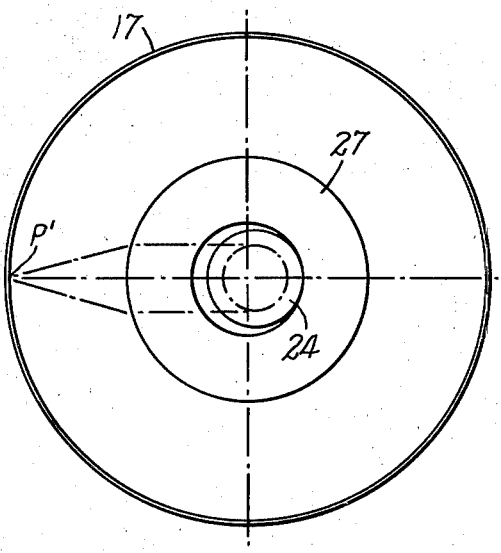
Figure 5:
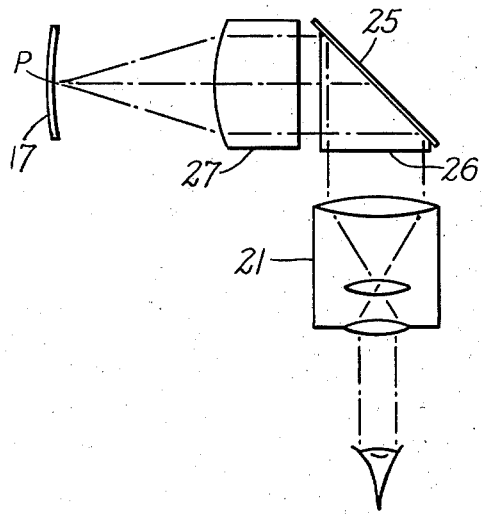
Figs. 5 and 6 are diagrammatic views corresponding to Figs. 3 and 4, respectively, but taken at right angles thereto.
Figure 6:
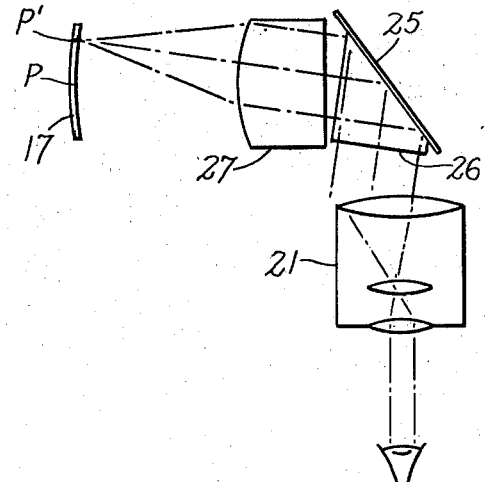

If, at the time of taking the reading, the common axis of the trunnions is canted with respect to the common axis of the bearings and scale, as indicated by the displacement of trunnion 24 in Fig. 4, light from a point P' on the scale, which is on an axial line through point P (Fig. 6), will be collimated by the component 27 and part of the collimated light will be directed into telescope 21 by mirror 25. Within the telescope, the collimated light will be brought to a focus and an image of point P' will be formed. Since point P' is on an axial line through point P, the scale reading for point P' is the same as that for point P.

In the situations above described, in which the common axis of the trunnions is displaced from the common axis of the bearings and the scale member, part of the light from point P, which has been collimated, will be lost and will not enter the telescope 21. However, a sufficient amount of the collimated light will be directed into the telescope to form an image of the point P or of a point axially aligned on the scale with point P. Thus, an accurate measurement of angular displacement of the member 22 can be made, even through the axis of rotation of the member is not exactly coaxial with the common axis of the bearings and scale at the time a reading on the scale is made.

Should it be desired to avoid light loss resulting from excessive displacement of the axis of telescope 22, telescope 21 may be attached directly to element 26 and support arms 19 eliminated so that telescope 21 moves with telescope 22. This modified construction also lends itself to more accurate alignment of telescope 21 with the line of sight.

In the device shown in Fig. 1, the scale is formed on a surface of spherical curvature and a surface of that shape is preferred, although a cylindrical surface may be used in some instances with acceptable results. The optical component 27, which forms a virtual image of the scale at infinity, is disposed within the strip carrying the scale in the first form of the instrument, but, if desired, the positions of the scale and component may be reversed and telescope 21 may be replaced by a sight of the reflex type, which superimposes the scale upon a scene being viewed through a telescope corresponding to telescope 22. Such a construction is illustrated in Figs. 7 and 8.

Figure 7:
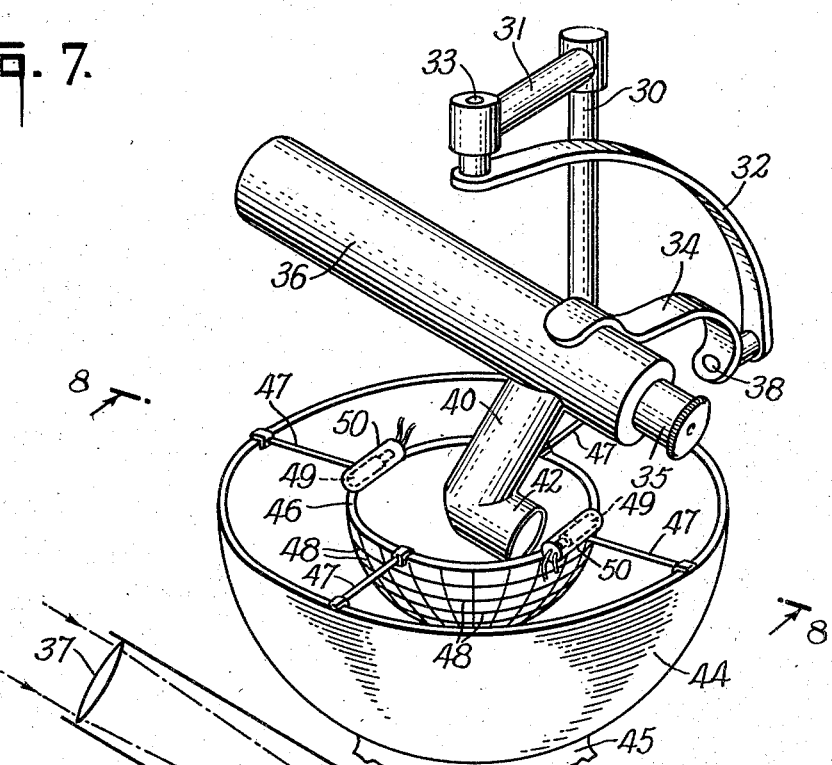
Fig. 7 is a view in perspective of another form of device embodying the system of the invention.
Figure 8:
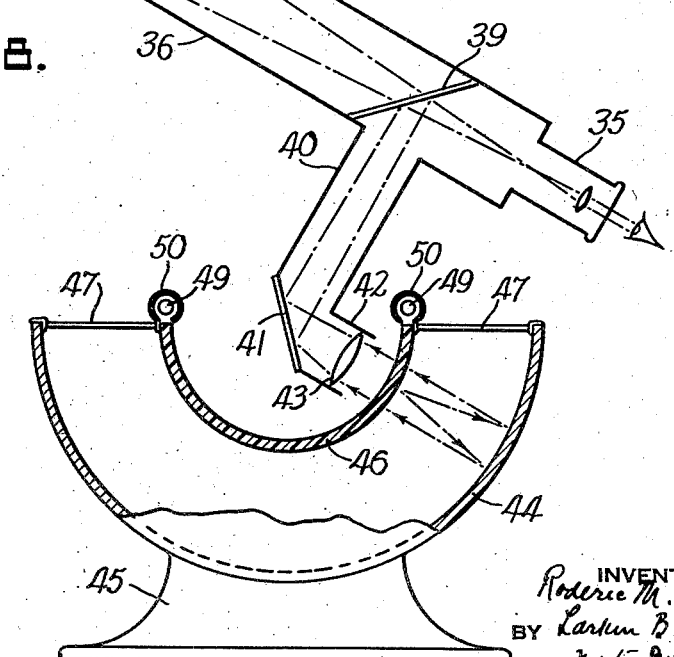
Fig. 8 is a vertical longitudinal sectional diagrammatic view, with parts omitted, of the device shown in Fig. 7.

The instrument shown in Fig. 7 includes a gimbal mounting comprising a standard 30, in the end of which a movable gimbal arm 32 is supported on a vertical pivot 33. The arm 32 extends downwardly from the pivot and a second gimbal arm 34 is supported on the lower end of arm 32 on a horizontal pivot 38. A telescope 36 is attached to the free end of arm 34 and is movable on pivot 33 as an azimuth axis and on pivot 38 as an elevational axis. The telescope is provided with an objective 37 mounted in the forward end of its barrel and an eye-piece 35 in its inner end. The telescope contains a beam splitting element 39 and a side tube 40 in line with the beam splitter. The side tube contains a diagonal plane mirror 41 at its outer end and has an end section 42 provided with a collimating lens 43. The optical axis of section 42 lies parallel to that of the telescope 36.

A hemispheric mirror 44 is mounted on a support 45 below the telescope and a thin transparent hemispheric element 46 is supported within the mirror by radial arms 47 engaging the rim of the mirror. Hemisphere 46 is provided on its outer surface with lines 48 inscribed thereon and forming a scale of grid form and is so thin as to be without any significant optical effect. The scale is illuminated by a plurality of electric lamps 49 mounted along and over the edge of element 46 in housings 50 having bottom openings. The element and mirror are concentric and the radius of the mirror is twice that of the outer surface of the element in order that scale lines 48 will lie at the focal point of mirror 44. This causes light from a point on the scale to be collimated when reflected by mirror 44, so that collimated light passes through lens 43, as shown by broken lines and arrows in Fig. 8. The azimuth and elevational axes of the gimbal support for telescope 36 pass through the common center of element 46 and mirror 44.

The focal length of lens 43 and the optical path of light reflected from mirror 41, passed through tube 40, and reflected from beam splitter 39, are such as to cause the scale to be focused at the focal plane of the telescope, so that the object and scale may be viewed simultaneously at infinity. Light passing directly from the scale through the system without reflection from the mirror adds scatter light but, since such light is not focused, it does not cause a second image of the scale to appear. As in the instrument shown in Fig. 1, the use of parallel light in the auxiliary optical system prevents minor errors in the position of telescope 36 with respect to the common center of hemisphere 46 and mirror 44 from introducing errors in the reading of the scale. By placing an index point on the scale, the initial position of an object can be readily determined and its movement from that position noted. The angular separation between two objects can be found by treating one point as a reference point and substracting its scale reading from the reading of the second point.

The instrument of Fig. 1 may be used to determine the angular separation of two objects in the plane in which the telescope 22 is movable, or the extent of angular movement of an object in that plane. Ordinarily, the telescope 22 will be mounted to move in a vertical plane, but it can move in a single plane only, while the telescope 36 is mounted for universal movement. Movement of telescope 36 utilizes in the reading an equatorial strip of scale lines 48, similar to scale 17.

We claim:

1. Apparatus for determining the angular separation of an object from a reference point, which comprises a scale disposed on a surface having a substantially spherical curvature, spherical optical means positioned in concentric focal relation with said scale for forming an image of the scale at infinity, means for rigidly maintaining the relative positions of said scale and said optical means, means for viewing the object, and means for viewing said scale from a point near its center of curvature, said means being adapted for viewing the scale in a direction having a determinable relation with respect to the direction of said object from the observer.

2. Apparatus for determining the angular separation of an object from a reference point, which comprises a scale disposed on a surface having a substantially spherical curvature, spherical optical means positioned in concentric focal relation with said scale for forming an image of the scale at infinity, means for rigidly maintaining the relative positions of said scale and said optical means, a telescope for observing the object, and means for viewing said scale from a point near its center of curvature, said means being adapted for viewing the scale in a direction having a determinable relation with respect to the direction of said object from the observer.

3. Apparatus for determining the angular separation of an object from a reference point, which comprises a scale disposed on a surface having a substantially spherical curvature, spherical optical means positioned in concentric focal relation with said scale for forming an image of the scale at infinity, means for rigidly maintaining the relative positions of said scale and said optical means, a telescope for observing the object, and optical means for observing the scale from a point near its center of curvature and in a direction having a determinable relation with respect to the direction of the object, as viewed through the telescope, from the observer.

4. Apparatus for determining the angular separation of an object from a reference point, which comprises a scale disposed on a surface having a substantially spherical curvature, an annular optical element rigidly positioned within said scale in fixed focal relation therewith for forming an image of the scale at infinity, and means for viewing said scale from a point near its center of curvature, said means including a telescope for observing the object, and a second telescope for observing the scale through the optical element, the optical axes of the telescopes being in fixed relation to one another.

5. Apparatus for determining the angular separation of an object from a reference point, which comprises a substantially spherical surface having scalar gradations of angular positions about an axis passing through its center of curvature, optical means for forming an image of the scale at infinity, said means including an annular optical element lying within the scale and having a surface of substantially spherical curvature concentric with the scale, a telescope for observing the object and lying with its axis normal to said scalar axis, and a second telescope for observing the scale through the element and lying with its axis coincident with that of the scale.

6. Apparatus for determining the angular separation of an object from a reference point, which comprises a scale disposed on a transparent surface of substantially spherical curvature, spherical optical means positioned in concentric focal relation with said scale for forming an image of the scale at infinity, means for rigidly maintaining the relative positions of said scale and optical means, means for viewing the object, and means for viewing said scale from a point near its center of curvature, said means being adapted for viewing the scale in a direction having a determinable relation with respect to the direction of said object from the observer.

7. Apparatus for determining the angular separation of an object from a reference point, which comprises a scale disposed on a transparent hemispherical surface, a hemispherical reflecting surface rigidly supported in concentric relation to said scale, said reflecting surface having a radius twice that of said scale, a telescope for observing the object, and optical means for viewing a portion of said scale from a point near its center or curvature and superimposed upon the field of view of said telescope.

8. Apparatus for determining the angular separation of an object from a reference point, which comprises a scale disposed on a transparent hemispherical surface, a hemispherical reflecting surface rigidly supported in concentric relation to said scale, said reflecting surface having a radius twice that of said scale, a telescope for observing the object, and optical means associated with the telescope for observing a portion of the scale simultaneously with said object and from a direction having a determinable relation to the direction of the object from the observer.

9. Apparatus for determining the angular separation of an object from a reference point, which comprises a scale disposed on at least an annular portion of a substantially spherical surface, spherical optical means positioned in concentric focal relation with said scale for forming an image of the scale at infinity, means for rigidly maintaining the relative positions of said scale and said optical means, means for viewing the object, and means for viewing said scale from a point near its center of curvature, said means being adapted for viewing the scale in a direction having a determinable relation with respect to the direction of said object from the observer.

10. Apparatus for determining the angular separation of an object from a reference point, which comprises a scale disposed on at least an annular portion of a substantially spherical surface, spherical optical means positioned in concentric focal relation with said scale for forming an image of the scale at infinity, means for rigidly maintaining the relative positions of said scale and said optical means, a telescope for observing the object, and means for viewing said scale from a point near its center of curvature, said means being adapted for viewing the scale in a direction having a determinable relation with respect to the direction of said object from the observer.

11. Apparatus for determining the angular separation of an object from a reference point, which comprises a scale disposed on at least an annular portion of a substantially spherical surface, spherical optical means positioned in concentric focal relation with said scale for forming an image of the scale at infinity, means for rigidly maintaining the relative positions of said scale and said optical means, a telescope for observing the object, and optical means for observing the scale in a direction having a determinable relation with respect to the direction of the object, as viewed through the telescope, from the observer.

12. Apparatus for determining the angular separation of an object from a reference point, which comprises a scale disposed on at least an annular portion of a substantially spherical surface, an annular optical element rigidly positioned within said scale in fixed focal relation therewith for forming an image of the scale at infinity, a telescope for observing the object, and a second telescope for viewing the scale through the optical element and from a point near its center of curvature, the optical axes of the telescopes being in fixed relation to one another.

References Cited in the file of this patent

UNITED STATES PATENTS

| | | |
|---|---|---|
| 2,313,204 | Morelle | Mar. 9, 1943 |
| 2,379,894 | Esval et al. | July 10, 1945 |
| 2,389,143 | Esval et al. | Nov. 20, 1945 |